United States Patent [19]

Ito

[11] Patent Number: 4,877,814
[45] Date of Patent: Oct. 31, 1989

[54] PROCESS FOR PRODUCING OPEN-CELL POLYETHYLENE FOAM MATERIALS AND THE RESULTANT PRODUCT

[75] Inventor: Hiroo Ito, Kyoto, Japan

[73] Assignee: Kabushiki Kaisha Serutekuno, Kyoto, Japan

[21] Appl. No.: 304,385

[22] Filed: Sep. 5, 1986

[30] Foreign Application Priority Data

Sep. 6, 1985 [JP] Japan .................. 60-198099
Sep. 17, 1985 [JP] Japan .................. 60-205795

[51] Int. Cl.⁴ .................. C08J 9/06; B29C 59/04; B29C 67/22
[52] U.S. Cl. .................. 521/79; 264/45.3; 264/54; 264/321; 264/DIG. 5; 264/DIG. 16; 264/DIG. 18; 521/143; 521/180; 521/182; 521/184; 521/185; 521/189
[58] Field of Search .................. 264/321, DIG. 18, 54, 264/DIG. 5, DIG. 16; 521/143, 180, 182, 184, 185, 189

[56] References Cited

U.S. PATENT DOCUMENTS

| | | |
|---|---|---|
| 3,159,854 | 7/1965 | Smith .................. 264/321 X |
| 3,239,585 | 3/1966 | Karpovich et al. .................. 264/321 X |
| 3,300,558 | 1/1967 | Grant et al. .................. 264/321 |
| 3,329,759 | 7/1967 | Rice .................. 264/321 |
| 3,386,877 | 6/1968 | Skochdopole et al. .................. 264/321 X |
| 3,394,214 | 7/1968 | Benning .................. 264/321 |
| 3,459,274 | 8/1969 | MacPhail, Sr. .................. 264/321 X |
| 3,608,056 | 9/1971 | Nelson .................. 264/321 |
| 3,862,291 | 1/1975 | Brandon, Jr. et al. .................. 264/321 |
| 3,865,674 | 2/1975 | Duling et al. .................. 264/321 X |
| 4,105,738 | 8/1978 | Rohn .................. 264/321 X |
| 4,435,346 | 3/1984 | Ito et al. .................. 264/54 |

FOREIGN PATENT DOCUMENTS

| | | |
|---|---|---|
| 887441 | 8/1981 | Belgium . |
| 1300262 | 5/1970 | United Kingdom .................. 47/10 |
| 1554147 | 5/1976 | United Kingdom .................. 9/4 |

Primary Examiner—Philip Anderson
Attorney, Agent, or Firm—Marshall, O'Toole, Gerstein, Murray & Bicknell

[57] ABSTRACT

This disclosure relates to a method for producing polyethylene open-cell foam materials, comprising a process step of pressurized heating at a temperature of 110° to 135° C. of a base compound consisting of polyethylene or a copolymer of polyethylene which has been compounded with an azodicarbonamide foaming agent and a bridging agent, in order to obtain a primary intermediate product with a cubical expansion coefficient of 1.0 to 2.0 times; a process step of heating the primary intermediate product under normal atmospheric pressure at a temperature of 150°~190° C. and thus causing the complete decomposition of the foaming agent in order to obtain a secondary intermediate product having cell membranes capable of being easily ruptured by mechanical compression; and a process step of subjecting said secondary intermediate product to mechanical pressure in order to rupture and interconnect the closed cells; and, as needed, a foaming assist agent, or a high-melting-point resin powder, or both a high-melting-point resin powder and a foaming assist agent are added to and compounded with the base compound so that the resulting products are high-expansive or ultra-high-expansive materials with an expansion ratio of 25 times said base compound, or more, and have an open-cell ratio nof 96~100%.

7 Claims, 1 Drawing Sheet

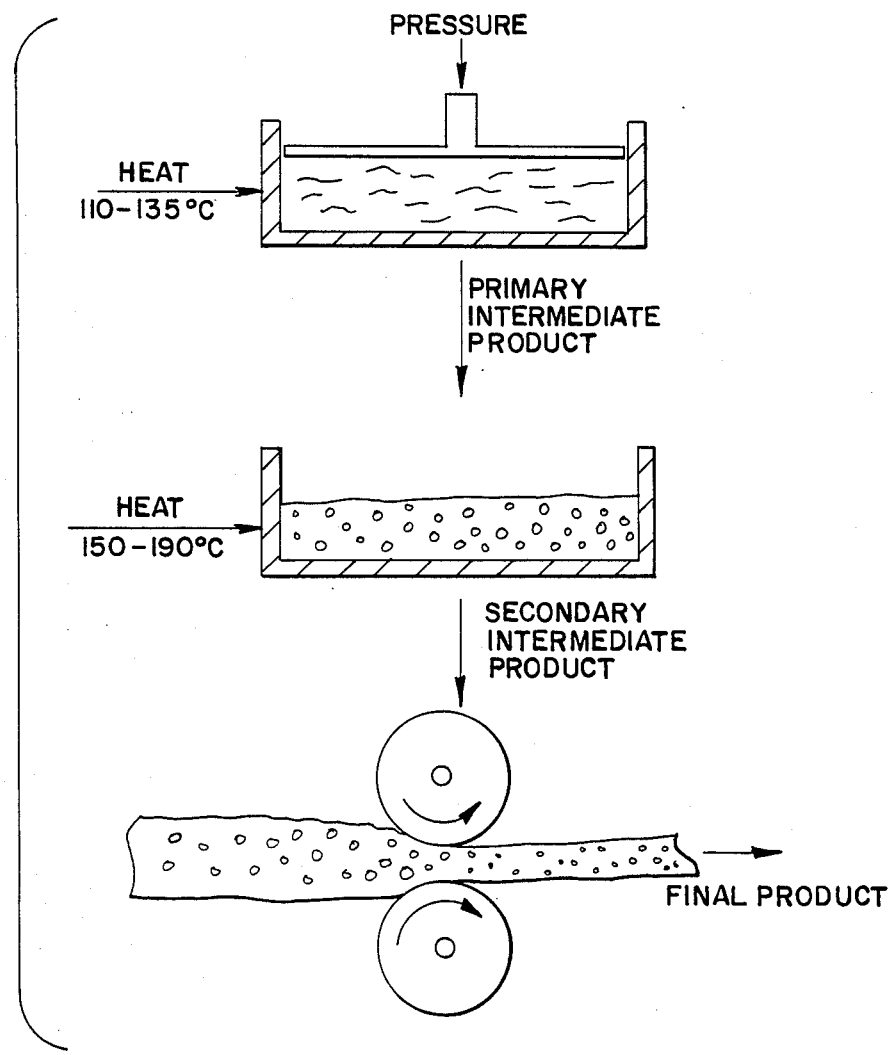

PROCESS FOR PRODUCING OPEN-CELL POLYETHYLENE FOAM MATERIALS AND THE RESULTANT PRODUCT

FIELD AND BACKGROUND OF THE INVENTION

This invention relates to a method of producing polyethylene or ethylene copolymer open-cell foam materials which are high-expansive or ultra-high-expansive materials with an expansion ratio of at least 25 times, and which have an open-cell ratio from 96 to 100%.

A conventional method dealing with the production of polyethylene or ethylene copolymer open-cell foam materials is described in Japanese Patent Publication No. SHO. 59-23545 (hereafter referred to as the conventional method). This conventional method includes three process steps: a first step in which a compound containing a foaming agent and a cross-linking agent is heated for a fixed period of time, thus forming a bridged first intermediate product in which the decomposition ratio of the foaming agent is 30% or less; a second step in which the remaining foaming agent and cross-linking agent are decomposed to form a second intermediate product having easily ruptured closed cells; and a third step in which the second intermediate product is compressed within a temperature range of about 0° to about 40° C. in order to rupture the closed cells.

The following three problems (a to c below) are inherent in the conventional method.
  (a) Judging from the embodiment examples of the conventional method, the expansion ratio of the second intermediate product is at a maximum of 6 to 15 times. (Although it is stated in the specification that an expansion ratio of 3 to 25 times is appropriate for the second intermediate product, even when all of the embodiments are taken into consideration and additional tests are performed, the maximum expansion ratio for the second intermediate product cannot be considered to be more than 15 times).
  (b) Thus, for the expansion ratio of the final product obtained through the compression rupturing of the second intermediate product, because the closed cells are simply ruptured by compression, it is essentially impossible to obtain an expansion ratio of greater than 15 times. In other words, the conventional method is not capable of providing so-called high expansive or ultra-high-expansive materials with an expansion ratio of 25 times or more.
  (c) According to the information in the specification of the above Japanese patent publication, the final product obtained using the conventional method has an open cell ratio of no more than 95%. In other words, because the final product is an open-cell foam material containing at least 5% independent cells, it lacks compression recovery, has poor water absorption and permeability, and is incapable of providing sufficient performance as an open-cell foam material. In short, the conventional method does not even come close to providing a product with a 100% open-cell ratio.

One may draw the following conclusions from a study of the reasons behind the problems described above. Because the decomposition ratio of the foaming agent in the first step is a maximum of 30% (the foaming agent decomposition ratio is listed in the specification as being preferably no more than 15%, and ratios of 12 to 25% are listed for the embodiments), even if the foaming agent decomposition ratio in the first step is low (foaming agent decomposition ratio of 15% or less), the decomposition of the foaming agent can also be considered to be a necessary condition. The fact that the decomposition of the foaming agent is a necessary condition even though the foaming agent decomposition ratio is no more than 30% means that the foaming agent must be rapidly decomposed in the foaming which occurs in the next process, and this necessarily requires that the foaming agent be processed beforehand (the heating to temperatures of 135° to 143° C. listed in the specification) so that it will be easily decomposed, and this heat processing can be thought to be designed to cope with the fact that the foaming agent will not decompose more than 30%. Thus, the range of the heating temperature in the first process can be thought to have a vital influence on the decomposition of the foaming agent.

In addition, because the decomposition of the foaming agent in the first step is done under pressure, the cell membranes which are formed at this time are as a result generally strong, and the thickness of the cell membranes remains unchanged through the completion of the second step, so that they are not ruptured by the mechanical compression in the final process. In effect, this can be considered to be one reason for the existence of closed cells.

Furthermore, according to the specification, the conditions for the heat processing in the second step of the first intermediate product obtained from the first step are temperatures of 190° to 210° C. However, as stated in the specification, the thicknesses of the cell membranes formed by the decomposition of the remaining undecomposed foaming agent are not uniform. Thus, when mechanical compression is used in the final step to rupture the cells, although the cells rupture at places where the cell walls are thin, they tend not to rupture at places where the cell walls are thicker. The result is that it is impossible to obtain any kind of open-cell foam material other than one which partially contains closed cells.

Based on the conclusions described above concerning the prior art method, and on the results of many experiments and much consideration, the present inventor has arrived at the following conclusions.

Ideally, it is best if the foaming agent does not decompose at all (foaming agent decomposition ratio of 0%) during the first step, and even if there is some decomposition, it should be kept extremely low (within 4%). This can be accomplished by meeting at least two conditions: (1) keeping the temperature for heating in the first step below 135° C., more specifically to within 110° to 135° C., and (2) keeping the amount of foaming assist agent added to within 0 to 0.45 parts by weight. It was confirmed by actual experiment that satisfying both of these conditions makes it possible to keep the decomposition of the foaming agent during the first step to within 0 to 4% (at an expansion ratio of 25 times).

In addition, in order to achieve an open-cell foam material in the third step which does not partially contain closed cells, the thickness of the cell walls in the second step must be approximately uniform and, moreover, thin. In order to accomplish this, the decomposition of the foaming agent should be delayed and the foaming action controlled to occur slowly. By doing this, it is possible to form closed cells with cell membranes which are both uniform in thickness and thin. It was confirmed by actual experiment that, in order to accomplish this, it is important to set the temperature for non-pressurized heating to 150° to 190° C., which is lower than that used in the prior art method.

This invention is based on the experimentally confirmed facts described above, and the purpose of the invention is to provide a method for the production of polyethylene or ethylene copolymer open-cell foam materials in which the final product has an ultra-high expansion ratio of 25 times or more and an open cell ratio of virtually 100%.

SUMMARY OF THE INVENTION

This invention includes four embodiments. The first embodiment is a method for producing polyethylene continuous open-cell foam materials whose characteristic feature is that it comprises a process step for the pressurized heating at a temperature of 110° to 135° C. of a base compound consisting of polyethylene or a copolymer of polyethylene which has been compounded with an azodicarbonamide foaming agent and a cross-linking agent in order to obtain a primary intermediate product with a cubical expansion coefficient of 1.0 to 2.0 times; a process step of heating the primary intermediate product under normal atmospheric pressure at a temperature of 150° to 190° C., thus causing the complete decomposition of the foaming agent in order to obtain a secondary intermediate product having cell membranes capable of being easily ruptured by mechanical compression; and a process step of subjecting the secondary intermediate product to mechanical pressure in order to rupture and interconnect the closed cells and thus obtain open-cell foam products.

The second embodiment is a method for producing polyethylene open-cell foam materials in which the base compound of the first embodiment also includes a foaming assist agent and is processed in the same manner as in the first embodiment.

The third embodiment is a method for producing polyethylene or ethylene copolymer open-cell foam materials whose characteristic feature is that it comprises a process step for he pressurized heating at a temperature of 110° to 135° C. of a base compound consisting of polyethylene or a copolymer of polyethylene which has been compounded with a high-melting-point resin powder with a melting point of at least 140° C. at a ratio of 5 to 30 parts by weight to 100 parts by weight of the polyethylene or a copolymer of polyethylene, an azodicarbonamide foaming agent, and a cross-linking agent in order to obtain a primary intermediate product with a cubical expansion coefficient of 1.0 to 2.0 times; a process step for heating the primary intermediate product under normal atmospheric pressure at a temperature of 150° to 190° C. and causing the complete decomposition of the foaming agent in order to obtain a secondary intermediate product having cell membranes capable of being easily ruptured by mechanical compression; and a process step of subjecting the secondary intermediate product to mechanical pressure in order to rupture and interconnect the closed cells and thus obtain open-cell foam products.

The fourth embodiment is a method for the production of polyethylene or ethylene copolymer open-cell foam materials whose characteristic feature is that the base compound of the third embodiment also includes a foaming assist agent and is processed in the same manner as in the third embodiment.

BRIEF DESCRIPTION OF THE DRAWING

The drawing schematically represents the three sequential steps of the process for producing the open-cell foam product claimed in this invention.

DETAILED DESCRIPTION OF THE INVENTION

The following is a description of the first and the second embodiments of the invention.

The foaming agent used in these two embodiments in an azodicarbonamide foaming agent. One feature of the base compound is that if the objective is to produce an ultra-high-expansive material with an expansion ratio of 45 times or more, a foaming assist agent is not used. In addition, another feature is that if the objective is to produce a material with an expansion ratio of 25 to 45 times a minute amount of metal oxide, high-grade fatty acid metallic salt, high-grade fatty acid ammonium salt, or urea compound is added either alone or in combination at a fixed ratio as a foaming assist agent.

Thus, in order to obtain an ultra-high-expansive material with an expansion ratio of 45 times or more, an azodicarbonamide foaming agent is added at a ratio of 30 parts or more by weight to 100 parts by weight of the base resin (for example, for a product with an expansion ratio of 50 times, 35 parts by weight of the foaming agent is added).

The reason for not adding a foaming assist agent to the base compound is that, because the azodicarbonamide foaming agent has a heat-generating reaction during decomposition, if, as explained above, large amounts of a foaming agent are added in order to obtain an expansion ratio of 45 times or more, decomposition is automatically stimulated by the heat generated during decomposition. However, because the resin is expanded to a high degree, the speeding up of decomposition through the addition of a foaming assist agent will invite such problems as the collapse of the cell membranes, thus making it impossible to obtain a high-quality product.

On the other hand, the reason for adding a foaming assist agent to the base compound producing a high-expansive product with an expansion ratio of 25 to 45 times is that, because there is little heat accumulated from the heat generated during expansion at a ratio of 25 to 45 times, if the foaming assist agent is not added, there will be insufficient expansion. Specifically, for an expansion ratio of 25 to 45 times, an azodicarbonamide foaming agent is added at a ratio of 14 to 30 parts by weight to 100 parts by weight of the base resin, and if zinc oxide (including activated zinc oxide) is used alone as the foaming assist agent, the addition of 0.05 to 0.1 parts by weight (for an expansion ratio of 25 to 30 times) or 0.01 to 0.05 parts by weight (for an expansion ratio of 40 times) is appropriate.

Also, if zinc stearate is used alone as the foaming assist agent, the addition of 0.03 to 0.45 parts by weight is appropriate. The additives should be mixed into the base compound by using a mixing roller or a pressurized kneader at a temperature at which decomposition of the base compound will not take place.

In addition, the reason for setting the heating temperature in the pressurized heating process to 110° to 135° C. is that there would be too little cross-linking reaction if the temperature were lower than 110° C., thus increasing the chances of contraction, folding, and other problems occurring during the rupture of the cell membranes in the next process. The foaming compound would then not be formed in the shape of the mold, and the surface of the product would be pitted and uneven.

On the other hand, if the temperature is higher than 135° C., the coefficient of cubic expansion (expansion ratio) could easily exceed 2.0 times and the cross-linking reaction would then advance to a higher level, thus making interconnection of the cells more difficult. The allowable range of heating time for this process is 15 to 60 minutes, and the ideal range is 20 to 40 minutes. In addition, a pressure of at least 3 kg/cm$^2$ is best for reasons of formability and thermal conductivity.

For the cross-linking agent, in addition to dicumyl peroxide, it is also possible to use 2,5 dimethyl-2,5 ditertiarybutyl-peroxyhexane, 2,5-dimethyl-2,5 ditertiarybutylperoxyhexane,$\alpha\alpha$-ditertiarybutyl-peroxydiisopropyl benzene, etc.

In addition, the reason for heating the primary intermediate product to a range of 150°–190° C. in the foaming process is that the foaming agent will not decompose completely at a temperature lower than 150° C., and, conversely, the decomposition of the foaming agent will speed up at a temperature higher than 190° C. and cause problems to occur.

Furthermore, in the process step of mechanically compressing the secondary intermediate product in order to rupture and interconnect the cells, it is sufficient to simply compress the product a few times. Doing this will easily provide a product with an open-cell ratio of 100%.

The following description will now cover the third embodiment and the fourth embodiment.

One characteristic feature of these two embodiments is the addition of a high-melting-point resin powder with a melting point of 140° C. or higher. This high-melting-point resin powder can be crystalline polypropylene, polycarbonate, polyamide, polyimide, polyethylene phthalate, etc.

The reason for the addition of this high-melting-point resin powder to the base compound is to form ultra-thin cell membranes in the base compound through the difference in viscosity. In other words, this high-melting-point resin powder does not melt during the process in which the base compound is obtained, so the cross-linking reaction proceeds only for the base resin. At the foaming stage in the next process, this resin powder is softened or melted, and the difference in viscosity between the base resin and the resin powder causes ultra-thin cell membranes to be formed at the locations of the resin powder, thus making it easier to achieve interconnection of the cells through mechanical compression.

In addition, the reason for limiting the resin powder to be added to one which has a melting point of 140° C. or higher is that if a resin powder other than one with a high melting point (140° C. or higher) were added to the base compound, the resin powder would melt during the mixing process or during the pressurized heating process from which the primary intermediate product is obtained, and thus the lack of sufficient difference in viscosity between the resin powder and the base resin would make it difficult for ultra-thin cell membranes to be formed.

Furthermore, although the possible range for addition of the high-melting-point resin powder to the base resin is 5 to 30 parts by weight, the preferred range is 10 to 20 parts by weight. If the amount added exceeds 30 parts by weight, the possibility of the collapse of the cells during the foaming process increases, and, if the amount added is less than 5 parts by weight, it is ineffective. Also, as becomes apparent from the reason described above, an appropriate temperature must be selected at which the high-melting-point resin powder will not be softened or melted during the pressurized heating process from which the primary intermediate product is obtained.

In addition, the reason for setting the heating temperature in the pressurized heating process to 110°–135° C. is that there would be too little cross-linking reaction if the temperature were lower than 110° C., thus increasing the chances of contraction, folding, and other problems occurring during the rupture of the cell membranes in the next process step. The foaming compound would then not be formed in the shape of the mold, and the surface of the product would be pitted and uneven.

On the other hand, if the temperature is higher than 135° C., the coefficient of cubic expansion (expansion ratio) could easily exceed 2.0 times and the cross-linking reaction would then advance to a higher level, thus making interconnection of the cells more difficult. The allowable range of heating time for this process step is 15 to 60 minutes, and the ideal range is 20 to 40 minutes. In addition, a pressure of at least 3 kg/cm$^2$ is best for reasons of formability and thermal conductivity. By using a pressure which will cause the base compound to be extruded out through the gap between the upper and lower halves of the mold during the pressurized heating process, such as at least 3 kg/cm$^2$, a primary intermediate product with a coarse cell structure can be easily obtained.

Furthermore, the reason for ensuring that the coefficient of cubic expansion in the pressurized heating process is no more than 2.0 times is that if the coefficient of cubic expansion exceeds 2.0 times, the pressurized condition will cause the gas generated by decomposition to be dispersed uniformly, thus causing strong cell membranes to be formed and making it difficult to interconnect the cells through mechanical compression.

In addition, by appropriately setting the heating time and heating temperature for this process so that the temperature is within a range of 110°–135° C. and the coefficient of cubic expansion is within a range of 1.0 to 2.0 times, it is possible to regulate the diameter of the cells in the product. In other words, if heating is performed for a long time at a high temperature, cell nuclei will be formed in the primary intermediate product and the cell structure will be fine; conversely, if the time is short and the temperature is low, the cell structure will be coarse even under pressure.

Also, another important factor in this embodiment is the slow decomposition of the foaming agent in the foaming process which will be described next. Because the base compound used makes this possible, the coefficient of cubic expansion during pressurized heating can easily be held to 2.0 times or below.

Furthermore, in order to produce thick foam materials with a high expansion ratio of 30 times or more, the slow decomposition of the foaming agent is extremely important. In other words, although the same is true for methods for the production of closed-cell foam materials, if the decomposition of the foaming agent occurs too quickly, the expansion of the resin will not be able to keep up with the quick foaming action, thus causing cavities to be formed inside the product, cracking to occur, and other problems, and consequently greatly reducing product quality. In addition, slight variations in temperature, etc., would make it impossible to guarantee complete reproducibility.

Next, the foaming agent which is added to the base compound in these two embodiments is an azodicarbonamide foaming agent. One feature of the base compound is that, if the objective is to produce an ultra-high-expansive material with an expansion ratio of 45 times or more, a foaming assist agent is not used. In addition, another feature is that, if the objective is to produce a material with an expansion ratio of 25 to 45 times, a minute amount of metal oxide, high-grade fatty acid metallic salt, high-grade fatty acid ammonium salt, or urea compound is added either alone or in combination at a fixed ratio as a foaming assist agent.

Thus, in order to obtain an ultra-high-expansive material with an expansion ratio of 45 times or more, an azodicarbonamide foaming agent is added at a ratio of 30 parts or more by weight to 100 parts by weight of the base resin (for example, for a product with an expansion ratio of 50 times, 35 parts by weight of the foaming agent is added).

The reason for not adding a foaming assist agent to the base compound is that, because the azodicarbonamide foaming agent has a heat-generating reaction during decomposition, if, as explained above, large amounts of foaming agent are added in order to obtain an expansion ratio of 45 times or more, decomposition is automatically stimulated by the heat generated during decomposition. However, because the resin is expanded to a high degree, the speeding up of decomposition through the addition of a foaming assist agent will invite such problems as the collapse of the cell membranes, thus making it impossible to obtain a high-quality product.

On the other hand, the reason for adding a foaming assist agent to the base compound in order to produce a highexpansive product with an expansion ratio of 25 to 45 times is that, because there is little heat accumulated from the heat generated during expansion at a ratio of 25 to 45 times, if the foaming assist agent is not added, there will be insufficient expansion. Specifically, for an expansion ratio of 25 to 45 times, an azodicarbonamide foaming agent is added at a ratio of 14 to 30 parts by weight to 100 parts by weight of the base resin, and if zinc oxide (including activated zinc oxide) is used alone as the foaming assist agent, the addition of 0.05 to 0.1 parts by weight (for an expansion ratio of 23 to 30 times) or 0.01 to 0.03 parts by weight (for an expansion ratio of 40 times) is appropriate.

Also, if zinc stearate is used alone as the foaming assist agent, the addition of 0.03 to 0.45 parts by weight is appropriate. The additives should be mixed into the base compound by using a mixing roller or a pressurized kneader at a temperature at which decomposition of the base compound will not take place.

In addition, in these two inventions, it is desirable to add an inorganic filler at the base compound stage. The reason for the addition of this filler is not a cost measure nor to improve the physical properties of the product, but rather to allow the decomposition of the foaming agent to be regulated.

Although it is unclear just how the inorganic filler acts upon the foaming agent, it is confirmed that the addition of the filler is effective in improving the thermal conductivity of the primary intermediate product and delaying the decomposition of the foaming agent. Thus, in comparison to when the inorganic filler is not added, there is more uniform expansion with less chance of localized excessive expansion, so the occurrence of problems is greatly reduced.

In particular, because the thermal conductivity of the base resin is poor, it would usually require a considerable length of time to evenly heat thick foam material right through to the center. However, by adding an inorganic filler with good thermal conductivity, the time required for heating is shortened, and there is less difference in the diameter of the cells between those in the center and those nearer the surface. This greater uniformity is considered to be the result of the improved thermal conductivity and the slower decomposition of the foaming agent.

Furthermore, because this inorganic filler also functions as the nuclei of the cells, finer, more uniform cells can be obtained than when the filler is not added.

Specifically, the inorganic filler used in this invention can be a carbonate such as calcium carbonate or magnesium carbonate, a metal oxide such as titanium oxide, calcium oxide, or magnesium oxide, or a filler material used for rubber, such as talc, clay, or mica. Although the amount added can range from 5 to 30 parts by weight, the ideal range is 10 to 20 parts by weight. If the amount added exceeds 30 parts by weight, the physical properties of the base resin will be adversely affected; if the amount added is less than 5 parts by weight, the desired effect will not be achieved.

For the cross-linking agent in these two embodiments, in addition to dicumyl peroxide, it is also possible to use 2.5 dimethyl-2.5 ditertiarybutyl-peroxyhexane, 2,5-dimethyl-2,5 ditertiarybutyl-peroxyhexane,$\alpha,\alpha$-ditertiarybutylperoxydiisopropyl benzene, etc.

The polyethylene or a copolymer of polyethylene mentioned in this embodiment can include, in addition to lowdensity polyethylene, ethylene vinyl acetate copolymer, chlorinated polyethylene, ethylene acrylate ester copolymer, ethylene propylene copolymer, ethylene butene copolymer, etc.

In addition, in the process in which the secondary intermediate product is obtained (the foaming process), the reason for heating the primary intermediate product to a range of 150° to 190° C. is that the foaming agent will not decompose completely at a temperature lower than 150° C., and conversely, the decomposition of the foaming agent will speed up at a temperature higher than 190° C. and cause problems to occur.

Furthermore, in the process of mechanically compressing the secondary intermediate product in order to rupture and interconnect the cells, it is sufficient to simply compress the product a few times. Doing this will easily provide a product with an open-cell ratio of 100%.

OPERATION

The following explanation will first cover the operation of the first embodiment and the second embodiment.

In these two embodiments, because the temperature range for the pressurized heating used to process the base compound into the primary intermediate product is 110° to 135° C. and the amount of foaming assist agent added is 0 to 0.45 by weight, the decomposition of the foaming agent is kept to below 4% to as low as 0%, and the cross-linking reaction is limited to only a part of the cross-linking agent, thus providing a primary intermediate product which could also be called a semi-bridged product.

When this primary intermediate product is heated under normal atmospheric pressure at 150° to 190° C., the cross-linking agent and the foaming agent are slowly decomposed, and an closed-cell foam material (secondary intermediate product) having closed cells with a high expansion ratio and thin cell membranes of a virtually uniform thickness is obtained.

Finally, simply by mechanically compressing this secondary intermediate product, because the closed cells have thin cell membranes of a virtually uniform thickness, it is possible to rupture all of the cell membranes and interconnect the cells with no closed cells remaining.

The following explanation will next cover the operation of the third embodiment and the fourth embodiment.

In these two embodiments, because the temperature range for the pressurized heating used to process the base compound into the primary intermediate product is 110° to 135° C. and the amount of foaming assist agent added is 0 to 0.45 parts by weight, the decomposition of the foaming agent is kept to below 4% to as low as 0% (for cases in which an inorganic filler has been compounded with the base compound, because the decomposition of the foaming agent is even further delayed, it is possible for the decomposition of the foaming agent to be 0% or extremely close to 0%; also, the improved thermal conductivity makes it possible to heat the base compound uniformly in a short time all the way to its center, and this addition of filler will also function to help the diameters of the cells throughout the product to be more uniform), and the cross-linking reaction is limited to only a part of the cross-linking agent, without melting or softening the high-melting-point resin powder, thus providing a primary intermediate product which could also be called a semi-bridged product.

When this primary intermediate product is heated under normal atmospheric pressure at 150°–190° C., the cross-linking agent and the foaming agent are slowly decomposed, the high-melting-point resin powder begins to melt or soften, and the difference in viscosity between this high-melting-point resin powder and the base resin makes it possible to obtain a closed-cell foam material (secondary intermediate product) having closed cells with a high expansion ratio and ultra-thin cell membranes of a virtually uniform thickness.

Finally, simply by mechanically compressing the secondary intermediate product, because the closed cells have thin cell membranes of a virtually uniform thickness, it is possible to rupture all of the cell membranes and interconnect the cells with no closed cells remaining (an open-cell foam material is obtained).

EFFECTIVENESS OF THE INVENTION

The following explanation will first cover the effectiveness of the first embodiment and the second embodiment.

With these two embodiments, it is possible to obtain high-expansive (expansion ratio of 25 to 45 times) or ultra-high-expansive (expansion ratio of 45 times or more) polyethylene or a copolymer of polyethylene open-cell material which contains no closed cells, or virtually no closed cells, and which has an open cell ratio of at least 96% using measurements in accordance with the Air Picno Meter Method (ASTM D2856). In addition, because the compression recovery, water absorption, and premeability are clearly superior to that of previously available open-cell foam materials which contained closed cells, the material produced by the method in these two embodiments can be expected to be used in applications which make use of these physical properties.

The following explanation will next cover the effectiveness of the third embodiment and the fourth embodiment.

With these two embodiments, it is possible to regulate the decomposition of the foaming agent in the process from which the primary intermediate product is obtained to 0 to 4% (it is also possible to set the decomposition of the foaming agent to 0% through the addition of an inorganic filler). Also, because the high-melting-point resin powder added to the base compound does not begin to melt or soften until the process from which the secondary intermediate product is obtained, the difference in viscosity between this high-melting-point resin powder and the base resin causes ultra-thin cell membranes to be formed, thus facilitating the interconnection of the cells through mechanical compression.

Therefore, with these two embodiments, it is possible to easily obtain high-expansive (expansion ratio of 25 to 45 times) or ultra-high-expansive (expansion ratio of 45 times or more) polyethylene or a copolymer of polyethylene open-cell material which contains no closed or independent cells, or virtually no independent cells, which has an open-cell ratio of at least 96% using measurements in accordance with the Air Picno Meter Method (ASTM D2856), and which is 100% reproducible. In addition, because the compression recovery, water absorption, and permeability of the product are clearly superior to that of previously available open-cell foam materials which contained independent cells, the material produced by the method in these two embodiments can be expected to be used in applications which make use of these physical properties.

EXAMPLES OF THE INVENTION

The following explanation will first cover the examples of the first embodiment and the second embodiment while comparing them with comparison examples.

EXAMPLE 1

A base compound consisting of an ethylene vinyl acetate copolymer (brandname: Evarflex P-1403, manufactured by Mitsui Polychemical Co. containing 14% by weight vinyl acetate), 18 parts by weight of an azodicarbonamide foaming agent, 0.03 parts by weight of activated zinc oxide, and 0.75 parts by weight of dicumyl peroxide was mixed using a mixing roller which had been heated to 95° C. The mixed base compound was then poured into a mold (internal dimensions: 30×350×700 mm) inside a press which had been heated to 128° C., and heated for 35 minutes under a pressure of 6 kg/cm$^2$ in order to obtain the primary intermediate product.

The primary intermediate product thus obtained had a coefficient of cubic expansion of 1.6 times with respect to the mold inside the press. Next, this primary intermediate product was placed in a heating container (internal dimensions: 95×1100×2100 mm) which had been heated to 160° C., heated for 130 minutes, and then cooled in room-temperature water in order to obtain the secondary intermediate product.

The secondary intermediate product thus obtained wa then fed four times through constant-speed rollers with the roller spacing set to 15 mm in order to rupture the cell membranes and obtain an open-cell foam product.

The product thus obtained was a high quality open-cell material with an excellent external appearance, a thickness of 86 mm, an apparent density of 0.030 g/cc (expansion ratio of 31 times), and, as measured in accordance with the Air Picno Meter Method (ASTM D2856), an open-cell ratio of 100%.

EXAMPLE 2

A base compound consisting of 100 parts by weight of the same resin used for Example 1, 23 parts by weight of an azodicarbonamide foaming agent, 0.01 parts by weight of activated zinc oxide, and 0.72 parts by weight of dicumyl peroxide was mixed using the same method as for Example 1, and then poured into a mold (internal dimensions: 28×330×660 mm) inside a press which had been heated to 125° C., and heated for 40 minutes under a pressure of 7 kg/cm$^2$ in order to obtain a primary intermediate product with a coefficient of cubic expansion of 1.6 times.

The primary intermediate product was then heated, expanded, and cooled under the same conditions as Example 1. After the foam material was thus obtained, the cells were interconnected using the same method as for Example 1.

The resulting product was a high-quality open-cell material with a thickness of 84 mm, an apparent density of 0.025 g/cc (expansion ratio of 37 times), and an open cell ratio of 100%.

EXAMPLE 3

A base compound consisting of 100 parts by weight of an ethylene vinyl acetate copolymer (brandname: Ultrathene UE630; containing 15% by weight vinyl acetate), 35 parts by weight of an azodicarbonamide foaming agent (ADCA), and 0.55 parts by weight of DCP was mixed using the same method as for Example 1, and then poured into a mold (internal dimensions: 20×200×200 mm) inside a press which had been heated to 125° C., and heated for 30 minutes under a pressure of 10 kg/cm$^2$ in order to obtain a primary intermediate product with a coefficient of cubic expansion of 1.2 times.

Next, this primary intermediate product was placed in a heating container (internal dimensions: 95×600×600 mm) which had been heated to 175° C., heated for 90 minutes, and then cooled in order to obtain the secondary intermediate product (foam material). After the foam material was thus obtained, the cells were interconnected using the same method as for Example 1. The resulting product was a ultra-high-expansive open-cell material with a thickness of 82 mm, an open cell ratio of 100%, and an apparent density of 0.019 g/cc (expansion ratio of 50 times).

COMPARISON EXAMPLE 1

The same base compound as for Example 1 was processed according to the same conditions as for Example 1 (with the exception that the press temperature was set to 140° C.) in order to obtain the foam material. After the pressurized heating in the press, the expansion ratio of the primary intermediate product was 3.0 times. When the foam material thus obtained was then passed through the rollers in the same way as for Example 1 in order to interconnect the cells, the open cell ratio was a low 55%, and the product obtained had severe deformation with a thickness contracted by the rollers to approximately 70 mm.

COMPARISON EXAMPLE 2

With the exception of the addition of 0.2 parts by weight of activated zinc oxide to the base compound as a foaming assist agent, the foam material was obtained according to the same conditions as for Example 1. After the pressurized heating in the press, the expansion ratio of the primary intermediate product was 3.0 times. The foam material thus obtained had already contracted to a thickness of 75 mm and many cracks had appeared in the surface.

Next, when this foam material was passed through the rollers in the same way as for Example 1 in order to interconnect the cells, the open cell ratio was 80%. The contraction of the foam material and, the appearance of cracks in the surface can be attributed to the rapid decomposition of the foaming agent.

The following explanation will next cover the embodiments of the third embodiment and the fourth embodiment while comparing them with comparison examples.

EXAMPLE 4

A base compound consisting 100 parts by weight of an ethylene vinyl acetate copolymer (brandname: Ultrathene UE630, containing 15% by weight vinyl acetate), 15 parts by weight of polycarbonate powder (brandname: Yupiron S-2000, permeable through 100 mesh sieve), 18 parts by weight of ADCA (azodicarbonamide foaming agent), 0.04 parts by weight of activated zinc oxide as a foaming assist agent, 0.8 parts by weight of DCP (dicumyl peroxide) cross-linking agent, and 10 parts by weight of heavy calcium carbonate was mixed using a mixing roller which had been heated to 95° C.. The mixed base compound was then poured into a mold (internal dimensions: 30×350×700 mm) inside a press which had been heated to 130° C., and heated for 40 minutes under a pressure of 5 kg/cm$^2$ in order to obtain the primary intermediate product.

The primary intermediate product thus obtained had a coefficient of cubic expansion of 1.1 with respect to the mold inside the press. Next, this primary intermediate product was placed in a heating container (internal dimensions: 95×1100×2100 mm) which had been heated to 160° C., heated for 130 minutes, and then cooled in room-temperature water in order to obtain the secondary intermediate product.

The secondary intermediate product thus obtained was then fed three times through a pair of constant-speed rollers at room temperature with the roller spacing set to 15 mm in order to rupture the cell membranes and obtain an open-cell foam product.

The product thus obtained was a high-quality open-cell material with an excellent external appearance, a thickness of 85 mm, an apparent density of 0.030 g/cc (expansion ratio of 31 times), and, as measured in accordance with the Air Picno Meter Method (ASTM D2856), an open cell ratio of 100%.

EXAMPLE 5

A base compound consisting of 100 parts by weight of an ethylene vinyl acetate copolymer (brandname: Evarflex P-1403, manufactured by Mitsui Polychemical Co., containing 14% by weight vinyl acetated, 15 parts by weight of crystalline polypropylene powder (brandname: Novatec P8 100J; permeable through 100 mesh sieve), 22 parts by weight of ADCA, 0.02 parts by weight of activated zinc oxide as a foaming assist agent, 0.8 parts by weight of DCP, and 15 parts by weight of heavy calcium carbonate was mixed using the same method as for Example 4, and then poured into a mold (internal dimensions: 28×330×660 mm) inside a press which had been heated to 128° C., and heated for 40 minutes under a pressure of 5 kg/cm² in order to obtain a primary intermediate product with a coefficient of cubic expansion of 1.3 times.

The primary intermediate product was then heated, expanded, and cooled under the same conditions as Example 4. After the foam material was thus obtained, the cells were interconnected by passing the foam material through constant speed rollers in the same way as for Example 4.

The resulting product was a high-quality open-cell material with a thickness of 83 mm, an apparent density of 0.025 g/cc (expansion ratio of 37 times), and an open cell ratio of 100%.

EXAMPLE 6

A foaming compound consisting of 100 parts by weight of the same resin used for Example 4, 10 parts by weight of polycarbonate powder (brandname: Yupiron S-2000, permeable through 100 mesh sieve), 30 parts by weight of ADCA (azodicarbonamide foaming agent), 0.6 parts by weight of DCP, and 15 parts by weight of heavy calcium carbonate was mixed using the same method as for Embodiment 4, and then poured into a mold (internal dimensions: 20×200×200 mm) inside a press which had been heated to 125° C., and heated for 30 minutes under a pressure of 5 kg/cm² in order to obtain a primary intermediate product with a coefficient of cubic expansion of 1.2 times.

Next, this primary intermediate product was placed in a heating container (internal dimensions: 95×600×600 mm) which had been heated to 175° C., heated for 90 minutes, and then cooled in order to obtain the secondary intermediate product (foam material). After the foam material was thus obtained, the cells were interconnected using the same method as for Example 4. The resulting product was an ultra-high-expansive open-cell material with a thickness of 82 mm, an open-cell ratio of 100%, and an apparent density of 0.019 g/cc (expansion ratio of 50 times).

COMPARISON EXAMPLE 3

The same base compound as for Example 4 was processed according to the same heating conditions as for Example 4 (with the exception that the press temperature was set to 140° C.) in order to obtain the foam material. The expansion ratio of the primary intermediate product thus obtained was 2.5 times, the thickness of the foam material was 92 mm, and there were no problems with the external appearance. Next, when the cells of the foam material were interconnected in the same way as for Example 4, the open cell ratio was 60%, and the product thickness had contracted to 75 mm.

COMPARISON EXAMPLE 4

With the exception of the addition of 0.2 parts by weight of activated zinc oxide to the base compound, the foam material was obtained according to the same conditions as for Example 4. After the pressurized heating, the expansion ratio of the primary intermediate product was 3.5 times. The foam material thus obtained had already contracted to a thickness of 75 mm and many cracks had appeared in the surface.

Next, when this foam material was passed through the rollers in the same way as for Example 4 in order to interconnect the cells, the open cell ratio was 85%. The contraction of the foam material and the appearance of cracks in the surface can be attributed to the sudden decomposition of the foaming agent during the foaming process.

What is claimed is:

1. A method for producing polyethylene open-cell foam materials whose characteristic feature is that it comprises:
   (i) a first process step of compacting a base compound into a tightly closed mold in a press at a pressure of about 3kg/cm² to about 10 kg/cm² which is heated at a temperature of approximately 110° to 135° C., said base compound comprising polyethylene or copolymer of polyethylene which has been compounded with an azodicarbonamide foaming agent and a cross-linking agent in order to obtain a primary intermediary product wherein said foaming agent and said cross-linking agent have a decomposition ratio of from about zero to about 4% to provide a cubical expansion coefficient of 1.0 to 2.0 times.
   (ii) a second process step of heating said primary intermediary product under normal pressure at a temperature of 150° to 190° C., thus causing the complete decomposition of said foaming agent and said cross-linking agent in order to obtain a secondary intermediate product having uniform cell membrane capable of being easily ruptured by mechanical compression; and
   (iii) a third process step of mechanically compressing said secondary intermediate product to rapture said cell membranes and thereby interconnect said cells and thus obtain open-cell foam products, said open-cell foam products having expansion ratios greater than about 25.

2. A method descried in claim 1 in which a foaming assist agent is added to said base compound.

3. A method described in claim 1 in which 5 to 30 parts by weight of a high-melting-point resin powder with a melting point of at least 140° C. is added to said base compound of polyethylene or copolymer of polyethylene.

4. A method described in claim 2 in which a foaming assist agent is added to said base compound.

5. The method described in claim 3 in which an inorganic filler is added to said base compound.

6. The method described in claim 4 in which an inorganic filler is added to said base compound.

7. A polyethylene open-cell foam material produced by the method set forth in claim 1.

* * * * *

UNITED STATES PATENT AND TRADEMARK OFFICE
CERTIFICATE OF CORRECTION

PATENT NO. : 4,877,814

DATED : October 31, 1989

INVENTOR(S) : Hiroo ITO

It is certified that error appears in the above-identified patent and that said Letters Patent is hereby corrected as shown below:

On title page, item [21]

Appl. No.: 304,385

Should read

Appl. No.: 904,385

Signed and Sealed this

Fourteenth Day of September, 1993

Attest:

BRUCE LEHMAN

*Attesting Officer*     *Commissioner of Patents and Trademarks*